(12) United States Patent
Hanawa et al.

(10) Patent No.: US 8,940,119 B2
(45) Date of Patent: Jan. 27, 2015

(54) PROCESS AND APPARATUS FOR PRODUCING BEAM MEMBER

(75) Inventors: Tatsuya Hanawa, Otsu (JP); Tamotsu Suzuki, Otsu (JP)

(73) Assignee: Toray Industries, Inc., Tokyo (JP)

(*) Notice: Subject to any disclaimer, the term of this patent is extended or adjusted under 35 U.S.C. 154(b) by 305 days.

(21) Appl. No.: 13/500,521

(22) PCT Filed: Oct. 13, 2010

(86) PCT No.: PCT/JP2010/067942
§ 371 (c)(1),
(2), (4) Date: Apr. 5, 2012

(87) PCT Pub. No.: WO2011/046137
PCT Pub. Date: Apr. 21, 2011

(65) Prior Publication Data
US 2012/0196083 A1    Aug. 2, 2012

(30) Foreign Application Priority Data
Oct. 16, 2009    (JP) .................. 2009-238825

(51) Int. Cl.
| | | |
|---|---|---|
| B32B 3/04 | (2006.01) | |
| B32B 38/08 | (2006.01) | |
| B32B 37/12 | (2006.01) | |
| B29C 70/50 | (2006.01) | |
| B29C 70/86 | (2006.01) | |
| B29B 11/16 | (2006.01) | |
| B29L 31/00 | (2006.01) | |

(52) U.S. Cl.
CPC .............. *B29C 70/50* (2013.01); *B29C 70/865* (2013.01); *B29B 11/16* (2013.01); *B29L 2031/008* (2013.01)
USPC ........................ 156/227; 156/500; 156/245

(58) Field of Classification Search
USPC .......................................... 156/227, 500, 345
See application file for complete search history.

(56) References Cited

U.S. PATENT DOCUMENTS

2009/0050263 A1*    2/2009    Suzuki et al. ................. 156/245
2010/0080952 A1    4/2010    Suzuki

FOREIGN PATENT DOCUMENTS

| JP | 4100839 U | 9/1992 |
|---|---|---|
| JP | 3549271 B2 | 8/2004 |
| JP | 2007001299 A | 1/2007 |
| WO | WO-2007119371 A1 | 10/2007 |
| WO | WO-2008090911 A1 | 7/2008 |

OTHER PUBLICATIONS

International Application Serial No. PCT/JP2010/067942, International Search Report mailed Dec. 28, 2010, 7 pgs.

* cited by examiner

*Primary Examiner* — Brent O'Hern
(74) *Attorney, Agent, or Firm* — RatnerPrestia

(57) ABSTRACT

A process for producing a beam member formed by a reinforcing fiber base material which has a web portion and at least a pair of flange portions extending to both sides via at least a branching point from the web portion, at a cross-sectional surface orthogonal to a longitudinal direction of the beam member, and by a shaped filler which fills a gap having a wedge shape formed at the branching point, is provided. The shaped filler is produced by: (A) a filler supply process for supplying a filler member configured by reinforcing fibers; (B) a preshaping process for providing a preshaped filler having at least a wedge projection portion, by pressurizing the filler member by a preshaping mold; and (C) a filler deforming process for providing a shaped filler by deforming the preshaped filler.

8 Claims, 14 Drawing Sheets

Fig. 10
(a) 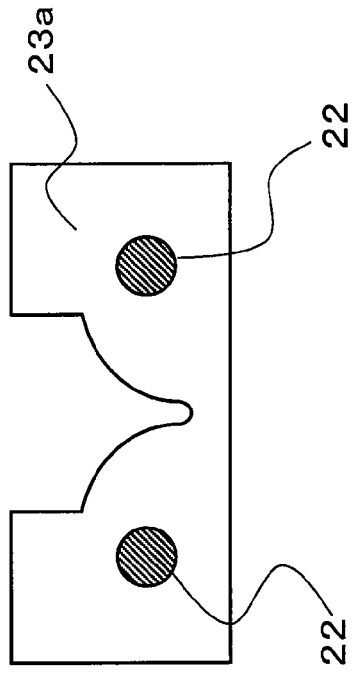
(b) 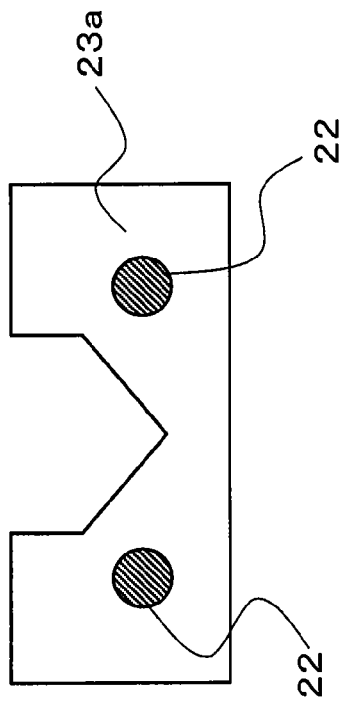
(c) 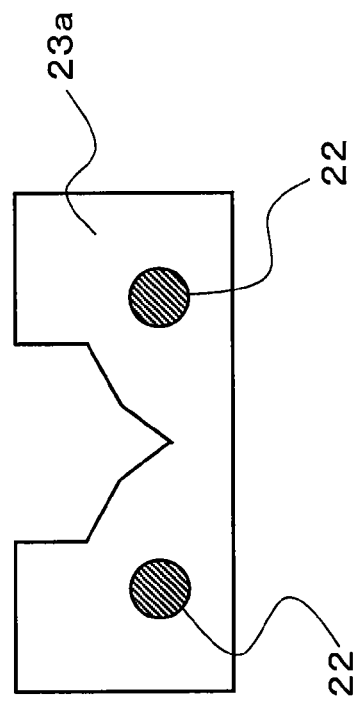

Fig. 11
(a)
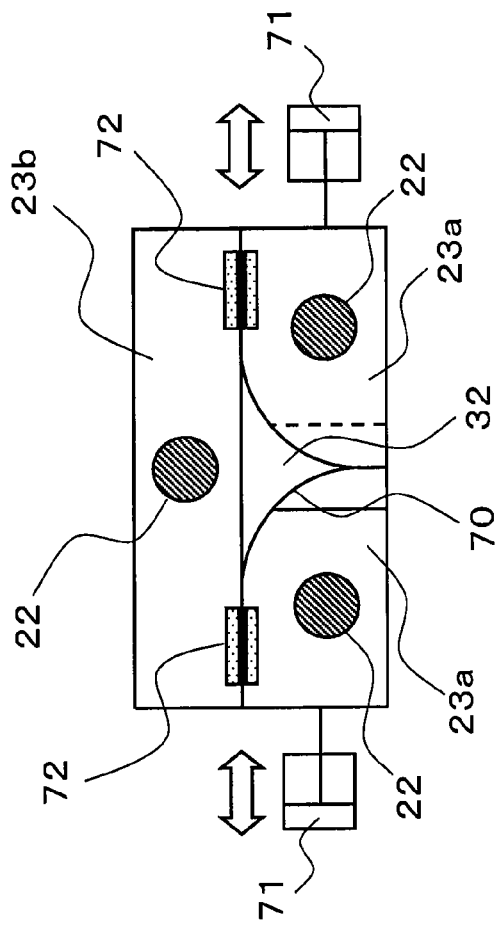
(b)
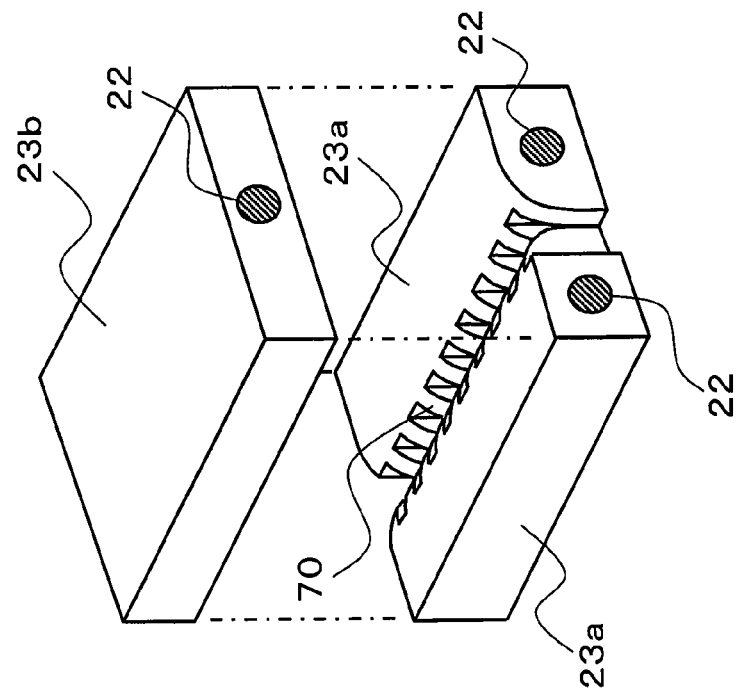

PROCESS AND APPARATUS FOR PRODUCING BEAM MEMBER

CROSS REFERENCE TO RELATED APPLICATIONS

This application is the U.S. National Phase application of PCT International Application No. PCT/JP2010/067942, filed Oct. 13, 2010, and claims priority to Japanese Patent Application No. 2009-238825, filed Oct. 16, 2009, the disclosure of which is incorporated herein by reference in its entirety for all purposes.

FIELD OF THE INVENTION

The present invention relates to a process and an apparatus for producing a beam member made of a reinforcing fiber base material. More particularly, the invention relates to a process and an apparatus for efficiently producing a shaped filler made of a fiber structure which is to fill as a reinforcing member a wedge gap of a beam member in a cross-sectional surface orthogonal to a longitudinal direction.

BACKGROUND OF THE INVENTION

Carbon-fiber reinforced plastics (CRFP) and glass-fiber reinforced plastics (GFRP) that use carbon fibers, glass fibers, or aramid fibers as reinforcing fibers have light weight and high durability. Therefore, these plastics are materials that are ideal for various constituent members that constitute automobiles, aircrafts, ships, and building components.

As a method of molding these fiber reinforced plastics (FRP), there is an autoclave molding method for pressurizing and/or heating and curing a laminate prepared by stacking prepreg sheets made of reinforcing fibers and an epoxy resin having high toughness in an autoclave (a pressure vessel), for example. A resin transfer molding (hereinafter referred to as "RTM") method and a vacuum RTM method are also well known. The RTM method and the vacuum RTM is a method of molding a compound material by impregnating a matrix resin in a reinforcing fiber, by arranging in a mold a laminate (may also be called a preform) prepared by stacking plural dry reinforcing fiber sheets not impregnated with a matrix resin, and by injecting a low viscosity liquid matrix resin into the mold.

In producing a beam member by combining a reinforcing fiber base material prepared by combining various reinforcing fiber sheets, a gap occurs between reinforcing fiber base materials that form a pair (at a branching point of two reinforcing fiber base materials having a bent portion). The gap occurs because the reinforcing fiber base materials cannot be completely deformed at a right angle due to high rigidity of the fibers when the reinforcing fiber base materials are bent.

For example, in the case of producing a beam member having a T-shaped cross-sectional surface by the RTM method or the vacuum RTM method, two L-shaped reinforcing fiber base materials 10a, 10b and one flat-plate-shaped reinforcing fiber base material 10c are combined together to form a preform 11 of a T-shaped beam member for a production reason, as shown in FIG. 1. At this time, a wedge gap 12 is formed at a branching point (a portion corresponding to the bent portion of the L-shape reinforcing fiber base material) of the two L-shaped members and the flat-plate-shaped member joined together. When a resin is injected into the preform of the T-shaped beam member in a state that the wedge gap is left as it is, a molded article having a resin-rich gap is obtained. When this molded article is applied to a wing or the like of an aircraft, the resin-rich gap generates insufficient rigidity and insufficient junction strength when a large tensile load acts, and this has a possibility of becoming a start point of break. Because fibers of the branching point are disturbed by a resin injection pressure at a molding time and because a gap ratio of the preform locally varies, there is a risk of occurrence of a void which becomes an internal defect of the molded article in the resin-rich gap.

To avoid a defect and strength reduction during such a molding process, the gap portion needs to be reinforced beforehand at a stage of producing the preform. As a reinforcement measure, a method of molding where a preshaped rod object (a shaped filler) made of a fiber structure is filled into the gap is well known. For example, there is proposed an invention concerning a preshaped rod object (a shaped filler) which is prepared by integrating a core member having a wedge cross-sectional surface made of a string composite having two or more continuous string composites converged, and an external member made of a continuous string configured in a cylindrical shape that covers an external peripheral surface of the core member in close contact with the external peripheral surface; and a method of producing such a rod preshaped object (Patent Document 1).

This method has no problem when the method is applied to a beam member that has a uniform thickness, a constant cross-sectional shape, and a constant wedge gap in a longitudinal direction. However, when a beam member is used as a cantilever, for example, a beam member of which a thickness changes in a longitudinal direction (a thickness is reduced toward a front end portion) is sometimes required. In this case, a problem occurs because a cross-sectional surface of the gap changes continuously or at stages following a change of the thickness of the beam member. This is because the cross-sectional surface area of a shaped filler that fills the wedge gap is difficult to be changed along a longitudinal direction. When a shaped filler having a constant cross-sectional surface area is used, many gaps remain in some places, or conversely, a density of reinforcing fibers contained in the cross-sectional surface of the gap becomes excessive. As a result, strength reduction or delamination occurs easily.

As a means for solving the above problem, there is proposed an invention concerning a process and an apparatus for producing a preshaped rod object (a shaped filler) that can be applied to gap portions of various cross-sectional surfaces and shapes, by gradually taking out a split mold while pulling a base material to a longitudinal direction with a die of a split-mold structure, following preparation, in advance, of the base material of a cut pattern which takes into account a change of the cross-sectional surface of the shaped filler (Patent Document 2).

However, according to this invention, particularly in the case of producing a preform of a long beam member in which a cross-sectional surface of a gap changes continuously at plural times, many dies (split molds) need to be prepared to change the cross-sectional surface of the shaped filler. Therefore, facility cost to produce the shaped filler increases, and a work process becomes extremely complex. Further, when preforms of plural kinds of beam members are manufactured, a shaped filler that matches respective gaps of the preforms needs to be produced. Because dies need to be prepared or exchanged each time, it takes time and labor, resulting in inefficiency.

Patent Documents

Patent Document 1: Japanese Patent Publication No. 3549271
Patent Document 2: Japanese Patent Application Laid-Open No. 2007-1299

SUMMARY OF THE INVENTION

In the light of the above problems, in producing the beam member made of the reinforcing fiber base material, the present invention provides a process and an apparatus for producing a beam member where a shaped filler to be filled in the gap is capable of being continuously and efficiently produced even in the case where a cross-sectional surface of the gap having a wedge shape formed at a branching point of a reinforcing fiber base materials changes in a longitudinal direction of the beam member, at a cross-sectional surface orthogonal to the longitudinal direction of the beam member.

The present invention employs any of the following processes.

(1) A process for producing a beam member formed by a reinforcing fiber base material which has a web portion and at least a pair of flange portions extending to both sides via at least a branching point from the web portion, at a cross-sectional surface orthogonal to a longitudinal direction of the beam member, and by a shaped filler which fills a gap having a wedge shape formed at the branching point, wherein the shaped filler is produced by at least the following production processes (A) to (C):

(A) a filler supply process for supplying a filler member configured by reinforcing fibers;

(B) a preshaping process for providing a preshaped filler having at least a wedge projection portion, by pressurizing the filler member by a preshaping mold; and (C) a filler deforming process for providing a shaped filler by deforming the preshaped filler, by filling the preshaped filler into the gap and by pressurizing the preshaped filler such that a tip of the wedge projection portion is directed to a tip of the gap having a wedge shape.

(2) The process for producing a beam member according to (1) above, wherein, a thickness of the reinforcing fiber base material changes in a longitudinal direction of the beam member and also a curvature radius of the reinforcing fiber base material at the branching point changes in the longitudinal direction of the beam member along a change of the thickness, wherein in the process (A), a reinforcing fiber sheet of which a quantity of reinforcing fibers changes in a longitudinal direction is supplied as the filler member, in the process (B), a preshaped filler of which a cross-sectional shape changes in a longitudinal direction is formed, by using a preshaping mold made of at least two mutually opposing molds, and by changing a gap between the molds by changing a relative position between the molds in accordance with a passing of a filler member between the molds, and further, the reinforcing fiber base material and the preshaped filler are intermittently carried by synchronizing the both in a longitudinal direction, and the process (C) is performed immediately after the preshaped filler passes the preshaping mold.

(3) The process for producing a beam member according to (1) or (2) above, wherein, in the process (B), a filler member is preshaped by using a preshaping mold that has a mold (x) having a concave portion made of a straight line portion and a wedge portion, a mold (y) having a convex portion which can be engaged with the straight line portion of the mold (x), and a mechanism for changing a relative position of the mold (y) to the mold (x), and by passing the filler member through a gap between the mold (x) and the mold (y).

(4) The process for producing a beam member according to any of (1) to (3) above, wherein, in the process (A), a reinforcing fiber sheet having a shape of which a width changes in a longitudinal direction is used as the filler member.

(5) The process for producing a beam member according to (4) above, wherein, in the process (A), the reinforcing fiber sheet is folded in a wave shape at least three times to a width direction of the reinforcing fiber sheet.

(6) The process for producing a beam member according to (4) or (5) above, wherein, a sheet comprising reinforcing fiber to which an adhesive resin in a particle shape, a fiber shape, or a sheet shape is partly added at least on one surface is used as the reinforcing fiber sheet.

(7) The process for producing a beam member according to (4) or (5) above, wherein, a prepreg that is formed by impregnating a matrix resin in advance in reinforcing fibers which form a sheet is used as the reinforcing fiber sheet.

(8) A beam member obtained by any of the production processes (1) to (7) above, wherein a cross-sectional surface shape in a longitudinal direction of the beam member is any of an I shape, a T shape, and a J shape.

(9) A fiber reinforced resin molded article obtained by impregnating a matrix resin in a beam member that is obtained by any of the production processes (1) to (6) above, and by curing the matrix resin.

(10) A fiber reinforced resin molded article obtained by curing a matrix resin that is impregnated in a beam member obtained by the production process (7) above.

(11) An apparatus for producing a beam member, comprising a carrying apparatus that intermittently carries at least two flat-plate-shaped reinforcing fiber base materials, a web portion forming apparatus that forms a bonded web portion by partly heating and pressurizing, by a mold, the flat-plate-shaped reinforcing fiber base materials carried; a flange portion forming apparatus that is provided at downstream side of the web portion forming apparatus, that opens a non-bonded part of the flat-plate-shaped reinforcing fiber base materials to left and right to form a flange portion and also to form a gap having a wedge shape at a branching point of the two reinforcing fiber base materials; a filler forming apparatus that forms a shaped filler; and an integrating apparatus that is provided at downstream side of the flange portion forming apparatus and the filler forming apparatus and that integrates the reinforcing fiber base materials and the shaped filler by heating and pressurizing in a superimposed state, wherein the filler forming apparatus further includes the following devices (a), (b):

(a) a device for forming a preshaped filler having at least one wedge projection portion, including a preshaping mold having a mold (x) having a concave portion made of a straight line portion and a wedge portion, a mold (y) having a convex portion which can be engaged with the straight line portion of the mold (x), and a mechanism for changing a relative position of the mold (y) to the mold (x); and (b) a pressurizing device that pressurizes the preshaped filler such that a tip of the wedge projection portion is directed to a tip of the gap having a wedge shape.

In the present invention, the "filler member" includes a member of which reinforcing fibers are configured so as to from a flat reinforcing fiber sheet by pulling the fibers at least in one direction, and a member configured by a straight line reinforcing fiber strand. A reinforcing fiber sheet can be configured by a form-stabilized dry reinforcing fiber cloth by partly adhering an adhesive resin described later to a reinforcing fiber, or can be configured by a form-stabilized prepreg having a matrix resin impregnated in a whole reinforcing fiber. As these reinforcing fiber sheets, a unidirectional woven fabric, a bidirectional woven fabric, a braided fabric, unwoven fabric, and the like are suitably used. A reinforcing fiber strand includes a strand unit, or an assembly of unit strands, and a braided cord, having plural reinforcing fibers arranged together. The reinforcing fibers include a carbon fiber, a glass fiber, an aramid fiber, etc.

The "reinforcing fiber base material" is the above-described "reinforcing fiber sheet" itself, or a layer of plural reinforcing fiber sheets. In the case of stacking reinforcing fiber sheets, fibers of the reinforcing fiber sheet can be stacked by changing directions of the fibers at 0°, +45°, −45°, 90° sequentially from a lower layer, to provide pseudoisotropy, for example, or can be stacked to reinforce in only a specific direction.

In the present invention, the "filler member" and the "reinforcing fiber base material" do not need to be made of the same materials. A dry reinforcing fiber sheet can be used for the "filler member", and a prepreg can be used for the "reinforcing fiber base material". A reinforcing fiber strand can be used for the "filler member", and a reinforcing fiber sheet can be used for the "reinforcing fiber base material", or vice versa.

The "reinforcing fiber base material which has a web portion and at least a set of flange portions extending to both sides via at least one branching point from the web portion" is a combined object that constitutes a web portion and a flange portion by combining at least plural reinforcing fiber base materials having bent portions. For example, as shown in FIG. 1, a web portion and a flange portion can be formed by combining three reinforcing fiber base materials 10a to 10c. Alternatively, a web portion and a flange portion can be formed by only plural reinforcing fiber base materials having bent portions, without the reinforcing fiber base material 10c on a flat plate as shown in FIG. 1. The "flange portion" is a horizontal plate element provided at an upper edge (or a lower edge) in a beam member of a T-shaped cross-sectional surface, for example. The "web" portion is a perpendicular plate element connected to the flange portion. Mainly by applying a resistance force acting on a bending moment of the flange portion and a resistance force acting on the shearing force of the web portion, a cross-sectional secondary moment becomes large, and bending rigidity improves.

The "wedge shape" is a shape where one end has a large width and the width becomes smaller toward the other end. Although the width becomes smaller toward the other end preferably at a uniform degree, the degree does not need to be uniform.

Further, the "adhesive resin" has a mode of a particle shape, a fiber shape, or a film shape, and is for partly adhering to a reinforcing fiber. Preferably, the "adhesive resin" has a glass transition temperature within a range of 50 to 100° C., when adhesion of a resin to a reinforcing fiber or handling in a normal temperature environment is considered. As a component of the adhesive resin, a component that improves easiness of handling a reinforcing fiber base material is preferable. More preferably, the component improves a mechanical property of a reinforced fiber plastic that is obtained by using the adhesive resin. For the adhesive resin, various thermosetting resins and/or thermoplastic resins can be used. The thermosetting resins include an epoxy resin, a phenol resin, an unsaturated polyester resin, for example. The thermoplastic resins include a polyethersulfone resin, a polyolefin resin, a polystyrene resin, a polyamide resin, a polyurethane resin, a polyphenylene sulfide resin, a polyetheretherketone resin, for example.

Further, the "matrix resin" is a resin impregnated with a whole reinforcing fiber, and is for stabilizing a form of a reinforcing fiber in a sheet shape. For the matrix resin, various thermosetting resins and/or thermoplastic resins can be used, in a similar manner to that of the adhesive resin. The thermosetting resins include an epoxy resin, a phenol resin, an unsaturated polyester resin, for example. The thermoplastic resins include a polyethersulfone resin, a polyolefin resin, a polystyrene resin, a polyamide resin, a polyurethane resin, a polyphenylene sulfide resin, a polyetheretherketone resin, for example.

According to embodiments of the process and the apparatus for production in the present invention, as explained below, in producing a beam member made of reinforcing fiber base materials, even when a cross-sectional surface shape of a wedge gap (a gap portion that is formed at a portion where a pair of reinforcing fiber base materials branches, for example) on a cross-sectional surface which is orthogonal to a longitudinal direction of the reinforcing fiber base material changes in the longitudinal direction of the reinforcing fiber base material, a shaped filler to fill the gap is continuously and efficiently produced, and a high-definition beam member can be obtained.

BRIEF DESCRIPTION OF THE DRAWINGS

FIG. 10 is a schematic view showing shape pattern examples (a) to (c) of a concave portion of a preshaping lower mold.

FIG. 11(a) is a schematic cross-sectional view and FIG. 11(b) is a schematic perspective view, showing a preshaping mold according to another embodiment that can be used in the present invention.

DETAILED DESCRIPTION

A preferred embodiment of a process and an apparatus for producing a beam member according to the present invention is explained below with reference to the drawings. Specifically, there is explained a case of changing an R shape (a curvature radius) of a curve line forming a wedge shape of a shaped filler, from a large R shape to a small R shape, corresponding to a change of a cross-sectional shape of a gap formed at a branching point of reinforcing fiber base materials that makes a pair configuring a beam member.

Figure 1:
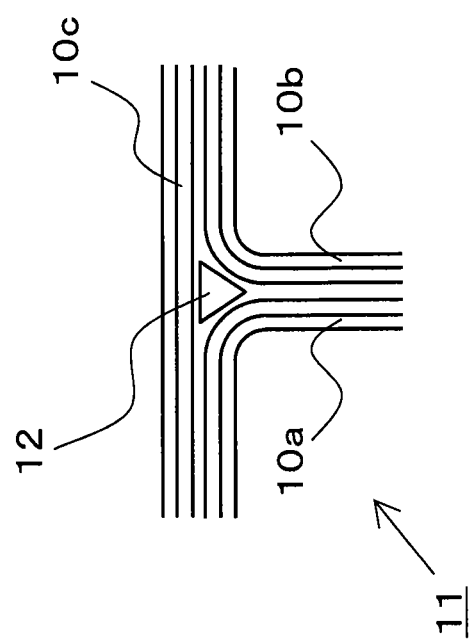
FIG. 1 is a schematic cross-sectional view showing a branching point of a beam member obtained by the present invention.
Figure 2:
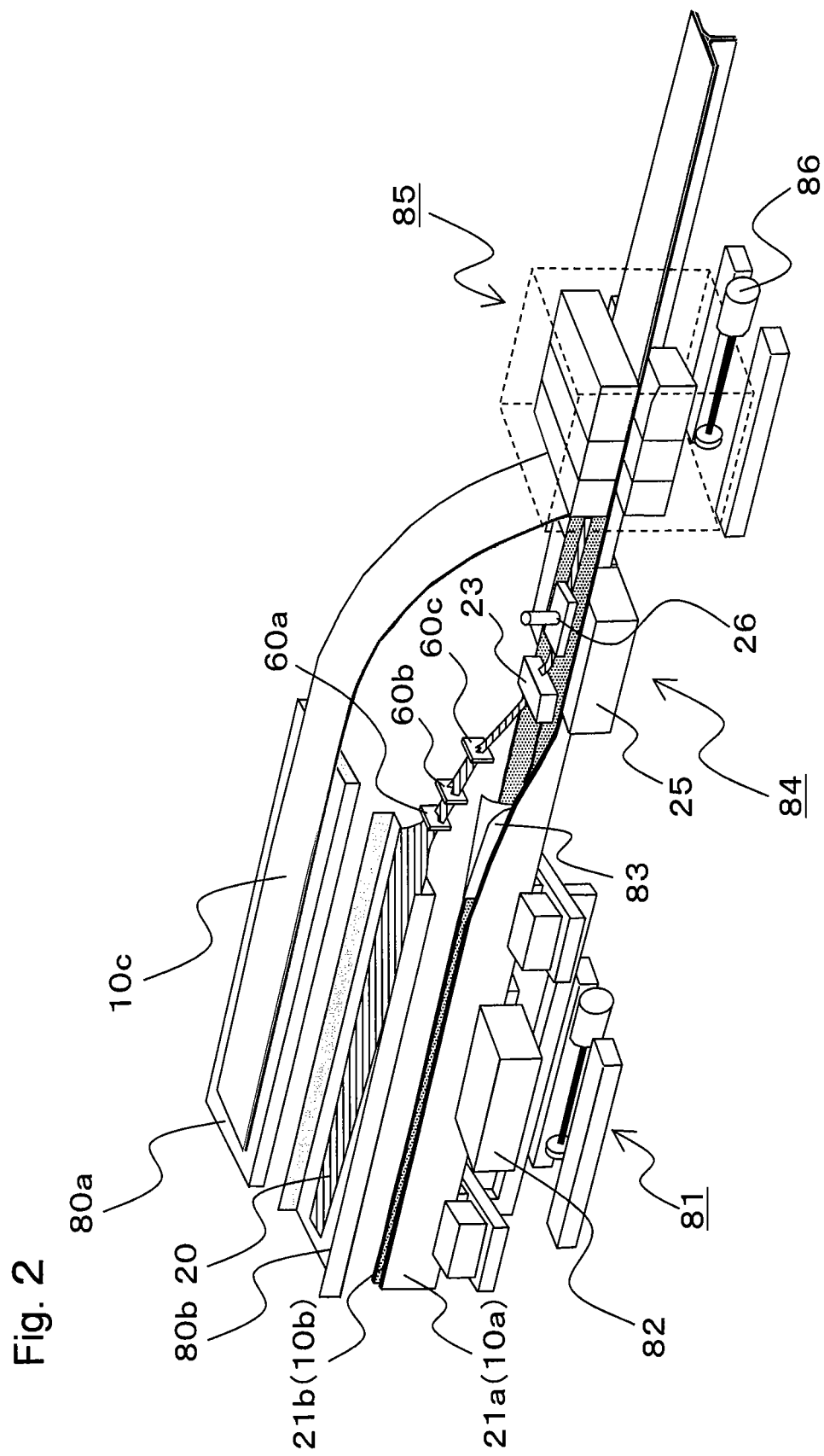
FIG. 2 is a schematic perspective view showing an example of an apparatus for producing a beam member used in the present invention.

FIG. 2 is a schematic perspective view showing an example of an apparatus for producing a beam member according to the present invention. More specifically, FIG. 2 shows an apparatus that produces a beam member with a T cross-sectional shape shown in FIG. 1. The apparatus mainly includes a material supplying apparatus (e.g. material supplying apparatuses 80a, 80b), a material carrying apparatus (e.g. a pulling apparatus 81), a web portion forming apparatus 82, a flange portion forming apparatus 83, a filler forming apparatus 84, and an integrating apparatus 85. These apparatuses are explained in detail below.

The material supplying apparatus is an apparatus that mounts various materials, such as a reinforcing fiber base material and a filler member, at suitable places of an apparatus for producing a beam member. For example, the material supplying apparatus corresponds to the material supplying apparatus 80a that includes a table for mounting a flat-plate-shaped reinforcing fiber base material 10c in FIG. 1, and the material supplying apparatus 80b that includes a table for mounting a filler member 20. Although FIG. 2 does not show material supplying apparatuses of reinforcing fiber base materials 10a, 10b in FIG. 1, the apparatus in FIG. 2 also includes these material supplying apparatuses.

Preferably, guides that are parallel with proceeding directions of various materials are set in the tables that constitute the material supplying apparatuses. With this arrangement, a positional deviation does not easily occur when various materials are integrated by the integrating apparatus 85 described later.

The material carrying apparatus is a carrying device that carries various materials to a downstream side within the apparatuses for producing a beam member. For example, the material carrying apparatus corresponds to a pulling apparatus 81 that intermittently carries reinforcing fiber base materials 21a, 21b corresponding to the reinforcing fiber base materials 10a, 10b in FIG. 1 to the integrating apparatus 85 at a constant interval. The pulling apparatus 81 is configured by plural chucks and an actuator that drives the chucks, and can hold two flat-plate-shaped reinforcing fiber base materials 21a, 21b. Although not shown in FIG. 2, the apparatus in FIG. 2 also includes a material carrying apparatus that carries the reinforcing fiber base material 10c and the filler member 20 to a downstream side synchronously with an intermittent supply of the reinforcing fiber base materials 21a, 21b.

The web portion forming apparatus 82 is configured by left and right molds having a heating mechanism, and partly heats and pressurizes the two reinforcing fiber base materials 21a, 21b when the pulling operation is stopped. With this arrangement, the web portion forming apparatus 82 shapes a web portion of the beam member, bonds between layers of the reinforcing fiber base materials by softening or melting an adhesive resin arranged between the layers, and fixes the shape.

The flange portion forming apparatus 83 is provided at a downstream side of the web portion forming apparatus 82, and includes a guide plate and the like provided between the two reinforcing fiber base materials 21a, 21b. The guide plate has a streamline shape, and gradually opens un-adhered portions of the reinforcing fiber base materials 21a, 21b to left and right. With this arrangement, a shape of the reinforcing fiber base materials 21a, 21b is changed from a flat-plate shape to an L-shape having a flange portion, and at the same time, a gap having a wedge shape that is recessed from the flange portion is formed at a branching point of the reinforcing fiber base materials 21a, 21b.

Although the flange portion forming apparatus 83 is shown as the guide plate in FIG. 2, the flange portion forming apparatus 83 can be a roller drape mechanism that gradually opens the reinforcing fiber base materials to an L shape by pulling the reinforcing fiber base materials with rollers and the like.

Figure 3:
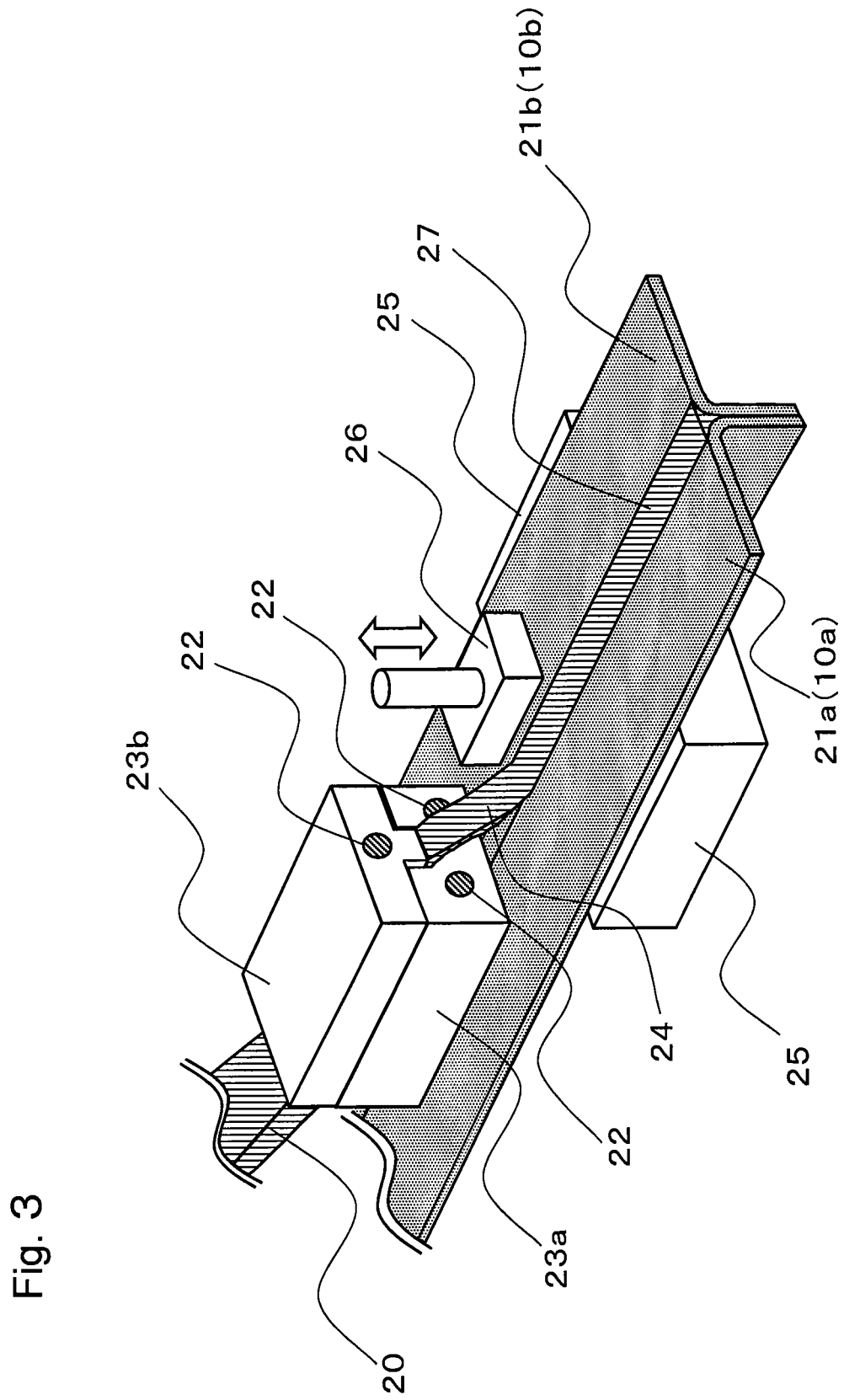
FIG. 3 is a schematic perspective view showing an example of a process for producing a shaped filler in the present invention.

The filler forming apparatus 84 includes a preshaping lower mold 23a having a concave portion, and a preshaping upper mold 23b having a convex portion that can be engaged with the concave portion, as shown in FIG. 3, for example. The filler forming apparatus 84 also includes a press machine 26 that forms a shaped filler 27, by pressing a preshaped filler 24 formed by these molds, to a direction of a tip of the gap having a wedge shape that is formed by opening the un-adhered portions of the reinforcing fiber base materials 21a, 21b to left and right. The filler forming apparatus 84 intermittently continuously forms the shaped filler 27 having a desired cross-sectional shape, together with a combined set of the reinforcing fiber base materials.

The integrating apparatus 85 provided at a downstream side of the flange portion forming apparatus 83 and the filler forming apparatus 84 has at least a heating mechanism, and preferably has a heating mechanism and a cooling mechanism. The integrating apparatus 85 is configured by an upper mold and a lower mold that can be divided into left and right sections. The integrating apparatus 85 superimposes the flat-plate-shaped reinforcing fiber base material 10c on the two reinforcing fiber base materials 21a, 21b opened in an L shape by the flange portion forming apparatus 83 and the shaped filler 27, integrates these objects together, and heats and pressurizes the integrated object. With this arrangement, an adhesive resin material on a surface of the reinforcing fiber base material is softened or melted, and layers are adhered together. Immediately after the adhesion, the adhered layers are cooled, and a shape of the beam member can be fixed. The integrating apparatus 85 includes a pulling mechanism 86 that sequentially carry out a formed beam member, operating in conjunction with an intermittent supply of the reinforcing fiber base materials 21a, 21b by the pulling apparatus 81 and an intermittent supply of the reinforcing fiber base material 10c and the filler member 20 by its carrying apparatus.

In the above apparatus, a beam member is produced as follows, for example. First, various materials such as reinforcing fiber base materials and filler members are mounted at predetermined positions of the apparatus for producing a beam member, by the material supplying apparatuses (the material supplying apparatuses 80a, 80b, for example). Thereafter, the various materials are intermittently carried to the integrating apparatus 85, by the material carrying apparatus (such as the pulling apparatus 81). In the middle of the carrying of the various materials to the integrating apparatus 85, the reinforcing fiber base materials 21a, 21b are partly heated and pressurized by the web portion forming apparatus 82, and the web portion is formed. After the web portion is formed, the un-adhered portions of the reinforcing fiber base materials 21a, 21b are opened to left and right by the flange portion forming apparatus 83, and the flange portion is formed. At this time, a gap having a wedge shape that is recessed from the flange portion is also formed at a branching point of the reinforcing fiber base materials 21a, 21b. On the other hand, a filler member is pressurized in the middle of being carried from the material carrying apparatus to the integrating apparatus 85, by a preshaping mold 23 that constitutes the filler forming apparatus 84, and a preshaped filler having at least one wedge projection portion is formed. Subsequently, the preshaped filler is mounted in a gap which is formed at the branching point of the reinforcing fiber base materials 21a, 21b, the tip of the wedge projection portion is pressurized by the press machine 26 to face a wedge tip of the gap, and a shaped filler is obtained. The L-shaped reinforcing fiber base materials 21a, 21b and the shaped filler 27 that are carried and produced in this way are superimposed with the flat-plate-shaped reinforcing fiber base material 10c when necessary, and are heated and pressurized to be integrated by the integrating apparatus 85.

In the embodiment shown in FIG. 2, in forming the web portion and the flange portion by combining reinforcing fiber base materials, the flat-plate-shaped reinforcing fiber base material 10c is combined in addition to the two L-shaped reinforcing fiber base materials 21a, 21b. Alternatively, the web portion and the flange portion can be formed by only two reinforcing fiber base materials having a bent portion. However, from a viewpoint of improving bending rigidity of the beam member to be obtained, preferably, the flat-plate-shaped reinforcing fiber base material 10c is combined with at least the two reinforcing fiber base materials 21a, 21b having a bent portion.

A detail of a production process of a shaped filler is explained next with reference to a schematic perspective view in FIG. 3.

In FIG. 3, 20 denotes a filler member that is configured by a dry reinforcing fiber sheet of which a form is stabilized by dispersing an adhesive resin material and by partly bonding the adhesive resin material to the reinforcing fiber. Reference numerals 21a, 21b denote L-shaped reinforcing fiber base materials, respectively being produced by bending a flat-plate-shaped reinforcing base material which is formed by stacking a reinforcing fiber sheet of a filler member and a similar reinforcing fiber sheet.

The reinforcing fiber base materials 21a, 21b are, as described above, mutually partly heated, pressurized, and adhered. The base materials are then intermittently carried to a downstream side by being held by a mold 25. In this case, the filler member 20 is folded while being carried to the preshaping mold 23 (the preshaping lower mold 23a and the preshaping upper mold 23b) at the same timing as that of a move of the two L-shaped reinforcing fiber base materials 21a, 21b held by the mold 25. The folded filler member 20 is heated and pressurized by being passed through between the preshaping lower mold 23a and the preshaping upper mold 23b that are heated respectively by a heater, and is then preshaped as the preshaped filler 24. Thereafter, the preshaped filler 24 is directly pressurized by the press machine 26 against the gap having a wedge shape formed at the branching point of the two L-shaped reinforcing fiber base materials 21a, 21b held by the mold 25. As a result, a shape of the preshaped filler 24 is changed, and the shaped filler 27 having a shape which fits the gap is provided.

At this time, because the preshaped filler 24 is preshaped to have a wedge projection portion by the preshaping mold 23, the preshaped filler 24 can be filled in a proper density without an unfilled portion to the depth of the gap having a wedge shape that is formed at the branching point of the two L-shaped reinforcing fiber base materials 21a, 21b.

It is sufficient that the preshaping mold 23 only pressurizes the filler member 20 to form a preshaped object if the filler member 20 has a desired temperature, in advance. Therefore, the filler member 20 can be heated at an upstream side of the preshaping mold 23, and thereafter pressurized by the preshaping mold 23 having no heating mechanism to form the preshaped filler 24. Alternatively, the filler member 20 can be preshaped to have a wedge projection portion by the preshaping mold 23 having no heating mechanism, and thereafter heated. The preshaped filler 24 obtained can be pressurized toward the gap having a wedge shape that is formed at the branching point of the two L-shaped reinforcing fiber base materials 21a, 21b.

When the filler member 20 is heated and pressurized by the preshaping mold 23 in the above-described mode, the filler member 20 can be easily deformed, and the preshaped filler 24 can be easily deformed to the shaped filler 27. Therefore, this embodiment is preferable. In addition, the apparatus for producing a beam member can be made compact.

When the filler member 20 is heated and pressurized by the preshaping mold 23, the preshaped filler 24 is kept softened by a heating process immediately after the preshaped filler 24 is pulled out from the preshaping mold 23. However, the preshaped filler 24 is gradually cooled and hardened when the preshaped filler 24 is placed in a normal temperature atmosphere, and becomes difficult to be deformed to the shaped filler 27. Therefore, preferably, the press machine 26 pressurizes immediately after the preshaped filler 24 passes between the preshaping molds, that is, while the carrying is stopped immediately after the preshaped filler passes between the preshaping lower mold 23a and the preshaping upper mold 23b.

A preshaping mold that can be used in the present invention is explained next.

The preshaping mold to be used preferably includes a mold (x) having a concave portion including a straight line portion and a wedge portion, and a mold (y) having a convex portion that can be engaged with the straight line portion of the mold (x). Further, preferably, the preshaping mold includes a mechanism for changing a relative position between the two molds (x), (y) that face each other.

Figure 4:
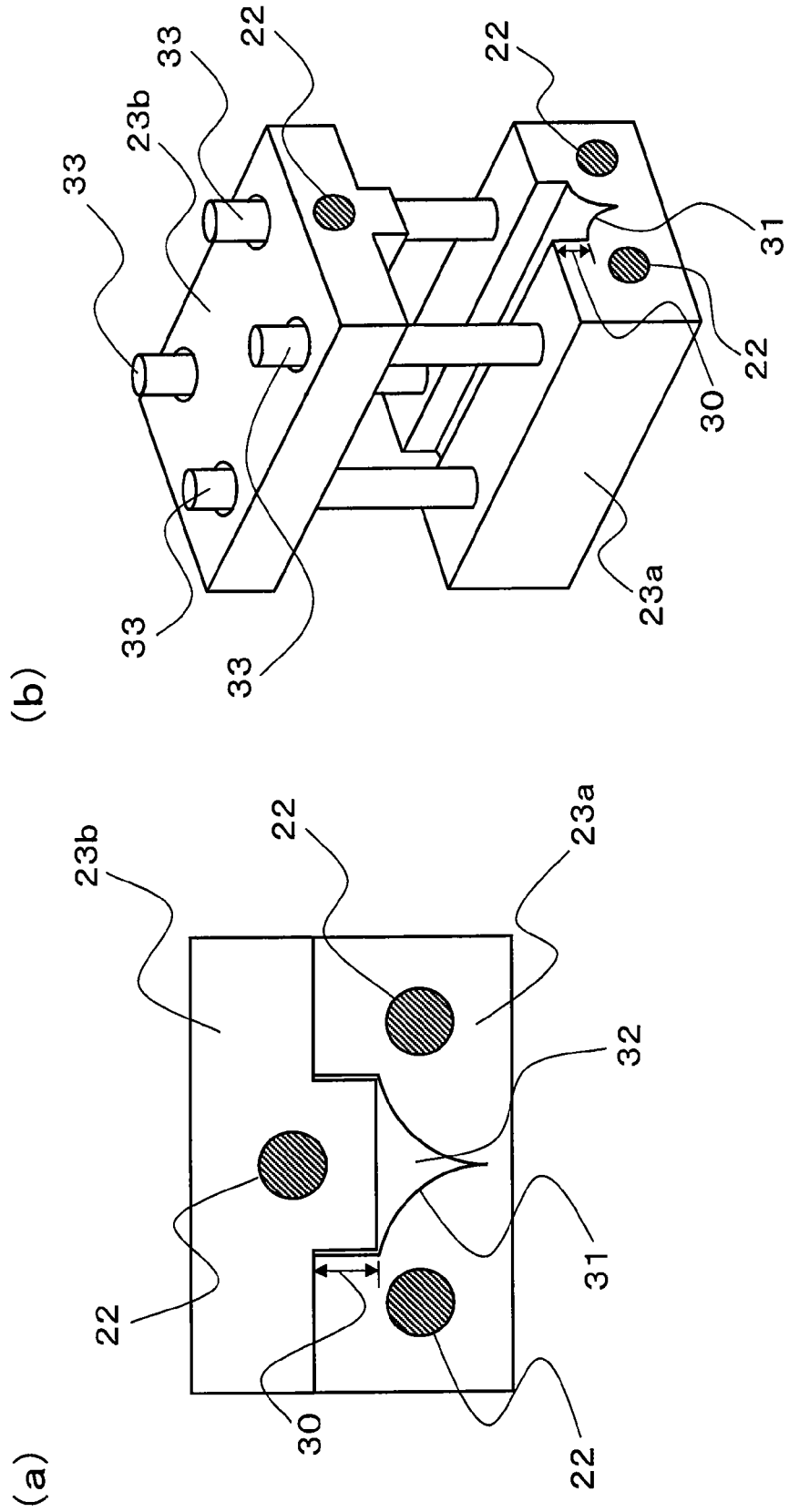
FIG. 4(a) is a schematic cross-sectional view and FIG. 4(b) is a schematic perspective view showing an example of a preshaping mold that can be used in the present invention.

Specifically, the preshaping mold is configured by the preshaping lower mold 23a and the preshaping upper mold 23b, as shown in FIG. 4. FIG. 4(a) is a schematic cross-sectional view, and FIG. 4(b) is a schematic perspective view.

The preshaping lower mold 23a shown in FIG. 4 is provided with a concave portion comprising a straight line portion 30 formed in a depth direction and a wedge curve line portion 31 that is connected to the straight line portion. In this case, preferably, a length of the straight line portion 30 is set large enough so that whole of filler members 20 is contained within the concave portion even when a maximum fiber quantity of the filler member 20 is input. The curve line portion 31 is made of an arc that matches a curvature radius of a bent portion at the combined object that is formed at the branching point of the two L-shaped reinforcing fiber base materials 21a, 21b. On the other hand, the preshaping upper mold 23b is provided with the convex portion that can be engaged with the straight line portion 30 of the lower mold. A filler member is accommodated in an area (a cross-sectional surface 32) surrounded by the preshaping lower mold 23a and the preshaping upper mold 23b, and is heated and pressurized. As a result, the filler member is preshaped to have the wedge projection portion.

Figure 5:
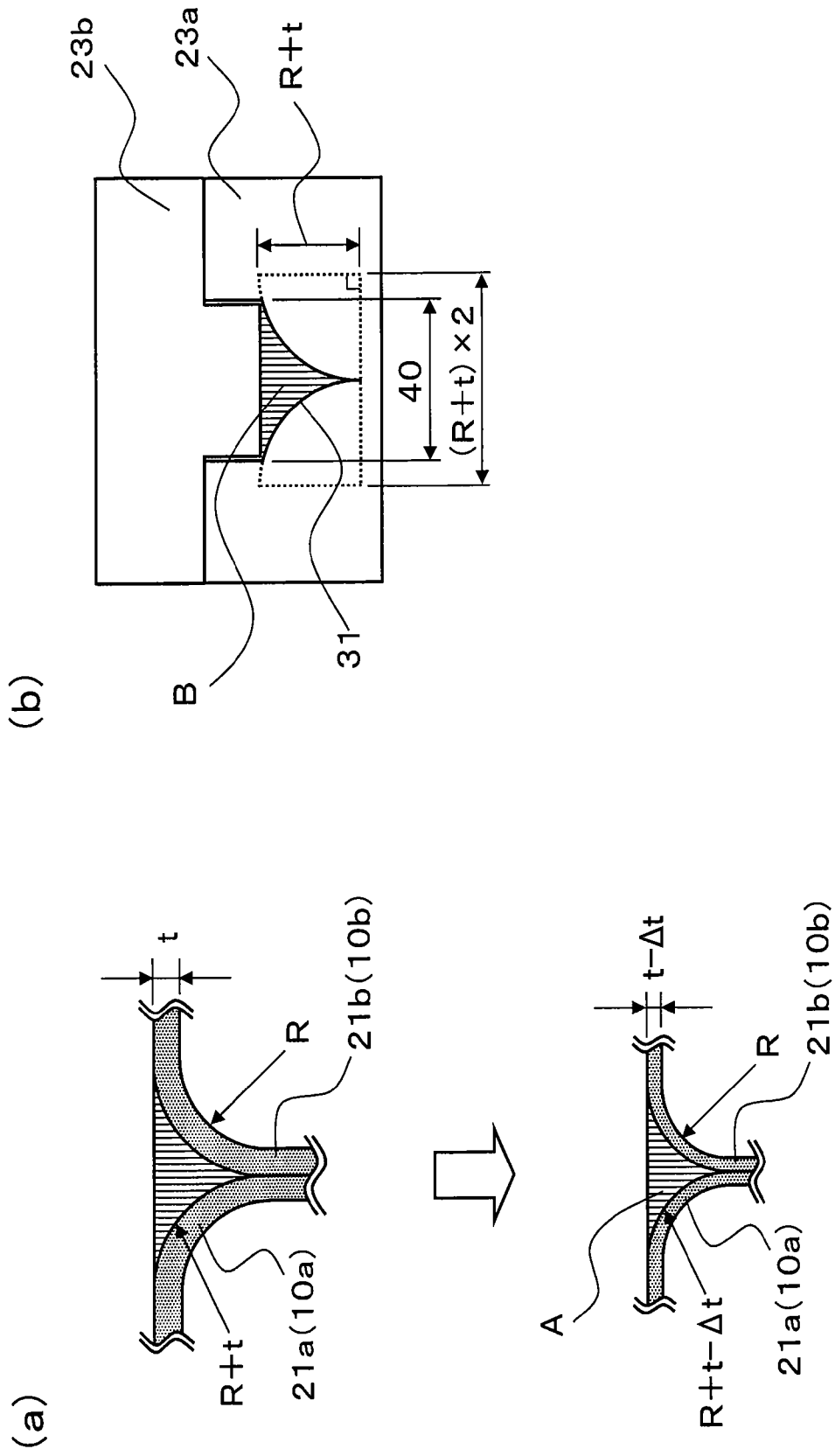
FIG. 5(a) is a schematic cross-sectional view showing an example of a beam member for a case where a thickness of a reinforcing fiber base materials changes from a large to small thickness and FIG. 5(b) is a schematic cross-sectional view showing an example of a preshaping mold in which a filler member is filled.

The area (the cross-sectional surface 32) surrounded by the preshaping lower mold 23a and the preshaping upper mold 23b is explained in further detail with reference to FIG. 5. FIG. 5(a) is a cross-sectional view of a beam member of which thicknesses of the two L-shaped reinforcing fiber base materials 21a, 21b change in a longitudinal direction of the beam member from t (an upper drawing in FIG. 5(a)) to t−Δt (a lower drawing in FIG. 5(a)). In the case of producing a beam member of which a curvature radius at a valley side of a bent portion of a reinforcing fiber base material is constant at R, a curvature radius at a hill side of the bent portion of the reinforcing fiber base material that is in contact with a preshaped filler changes from R+t to R+t−Δt corresponding to thinckness change, as shown in FIG. 5(a). In this case, preferably, a curvature radius of the curve line portion 31 of the preshaping lower mold 23a matches the curvature radius R+t at the hill side when the reinforcing fiber base material has a maximum thickness t, as shown in FIG. 5(b). Further, preferably, a lateral width 40 of the cross-sectional surface 32 of an area surrounded by the preshaping mold is set in a relationship of A≥B, where A is a cross-sectional area of a gap having a wedge shape formed at a branching point when a thickness of an L-shaped reinforcing fiber base material is the smallest (a thickness is t−Δt), and B is an area of the cross-sectional surface 32 of an area surrounded when the preshaping lower mold 23a and the preshaping upper mold 23b are closest to each other. That is, preferably, the curve line portion 31 of the preshaping lower mold 23a has a curvature radius R+t, and the lateral width 40 of the cross-sectional surface surrounded by the preshaping lower mold 23a and the preshaping upper mold 23b becomes smaller than a value of the radius (R+t)×2 as shown by a dotted line in FIG. 5(b). By configuring the preshaping mold in this way, a preshaped filler obtained is crashed through pressing by the press machine, and the reinforcing fibers contained in the preshaped object can be easily spread to left and right, and can be finally deformed in a proper shape.

As a mechanism for changing a relative position of opposing two molds, a configuration as shown in FIG. 4(b) can be employed, for example. For example, preferably, a sliding mechanism is provided, such as a guide shaft 33 is installed between the upper and lower molds, such that the preshaping upper mold 23b can be smoothly brought close to or retracted from the preshaping lower mold 23a. In this way, by configuring one of the preshaping lower mold 23a and the preshaping upper mold 23b to be able to be retracted from or brought close to each other in up and down directions such that a relative position of the preshaping upper mold 23b in a direction perpendicular to the preshaping lower mold 23a can be changed, a shape (an area of a cross-sectional surface orthogonal to a longitudinal direction) of the preshaped filler 24 can be changed to match a change of a fiber quantity of the filler member 20.

Regarding a relative position of the preshaping upper mold 23b to the preshaping lower mold 23a, an interval between the preshaping lower mold 23a and the preshaping upper mold 23b can be suitably adjusted by a servomotor based on data which is input in advance corresponding to a change of the fiber quantity of the filler member 20. An interval between the upper and lower molds can be adjusted by a spring. Further, in the case of engaging the preshaping upper mold 23b with the preshaping lower mold 23a by dropping the preshaping upper mold 23b by force of gravity, the preshaping upper mold 23b is automatically accommodated at a proper position by reactive force of the filler member 20, and therefore, this is preferable.

Further, preferably, the preshaping mold is provided with a mechanism to heat the filler member. Specifically, as shown in FIG. 4, for example, each of the preshaping lower mold 23a and the preshaping upper mold 23b is preferably provided with one or plural hollow portions 22 to pass a heater to heat the filler member 20. For the heater, an electric heater capable of increasing a temperature in a short time is preferably used from a viewpoint of work efficiency, but is not limited to the electric heater. Preferably, the heater can adjust a temperature of a mold to a target temperature by a temperature adjusting apparatus (not shown), and can heat a filler member by bringing the filler member into contact with the mold. Although there is no particular limit to a range of a heating temperature of the filler member 20, the heating temperature is higher than a softening temperature Tg of an adhesive resin and a matrix resin, preferably by 5° C. or more, and more preferably by 10° C. or more, to soften the adhesive resin or the matrix resin contained in the filler member at a proper temperature.

Preferably, the preshaping mold surface which is in contact with a preshaped filler member is made of a material having a mold release property.

A method of forming the shaped filler 27 by changing a cross-sectional shape of the preshaped filler 24 is explained below in further detail with reference to the following drawings.

Figure 6:
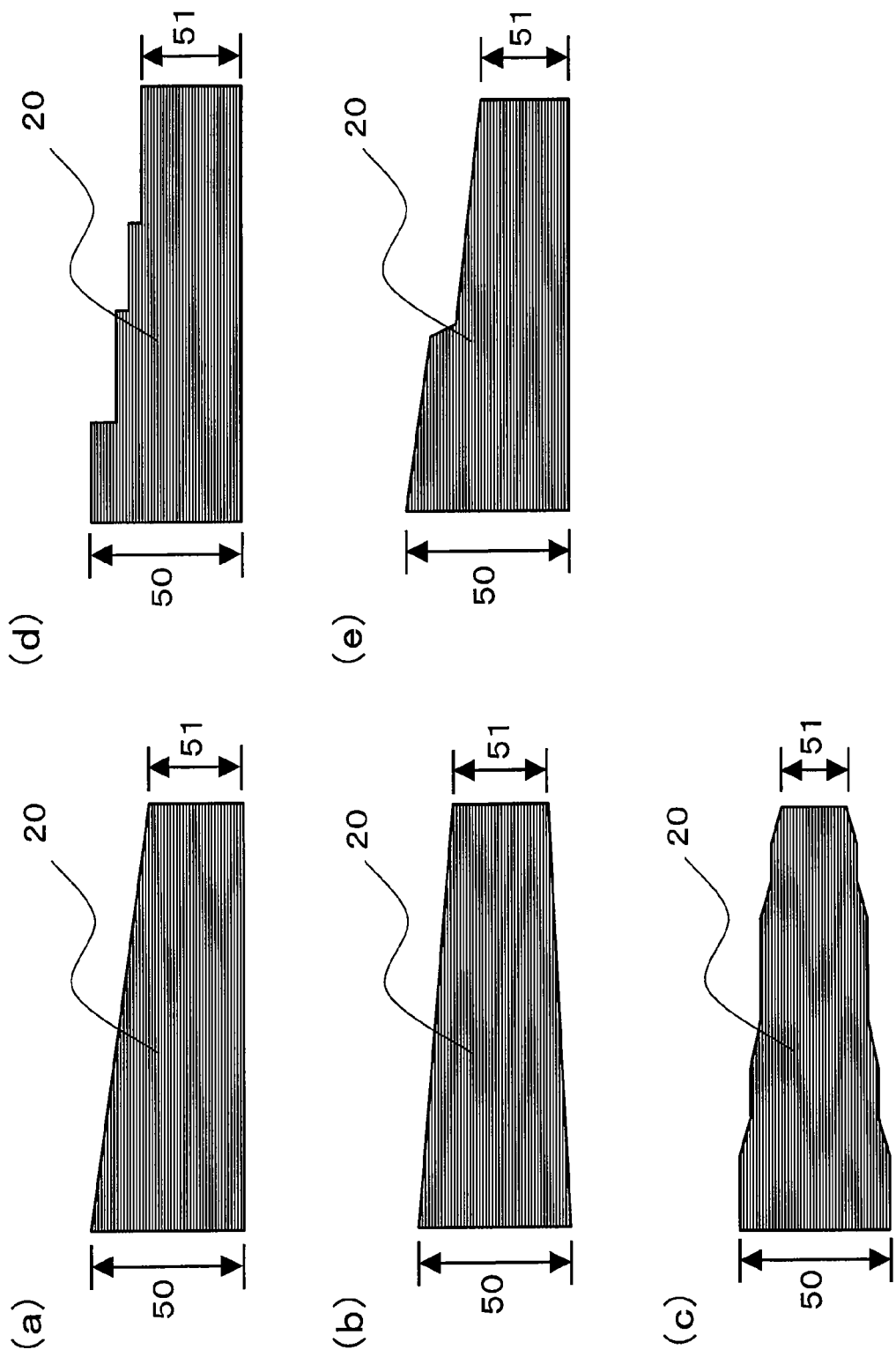
FIG. 6 is a schematic view showing an example of cutting patterns (a) to (e) of a filler member used in the present invention.

FIG. 6 is a schematic view showing an example of cutting patterns of the filler member 20 made of a reinforcing fiber sheet that can be used in the present invention.

As shown in FIG. 6(a), for example, a reinforcing fiber sheet to be used in a filler preparation process is cut as to change a fiber quantity by suitably changing a width of the reinforcing fiber sheet in a longitudinal direction. With this arrangement, the reinforcing fiber sheet can be suitably adapted to a change of a cross-sectional area in a longitudinal direction of the gap that is formed at the branching point of the beam member. In this case, the reinforcing fiber sheet to be prepared is in substantially a trapezoidal shape. For example, to a side 50 having a large width and a side 51 having a small width, one of other two sides can be at a right angle, as shown in FIG. 6(a), or both of the other two sides can be cut obliquely to the side 50 having a large width and the side 51 having a small width of the reinforcing fiber sheet, as shown in FIG. 6(b). Further, when the reinforcing fiber sheet is adapted to a cross-sectional area of the gap that is formed at the branching point of the beam member, preferably, the reinforcing fiber sheet is cut partly obliquely or at stages, as shown FIG. 6(c) to FIG. 6(e).

In the case of producing a shaped filler having a constant cross-sectional surface in a longitudinal direction, a reinforcing fiber sheet of a constant width is prepared. In the case of using an assembly of plural strands for the filler member 20, a reinforcing fiber sheet can be adapted to a cross-sectional area of a gap to be formed at the branching point of the beam member by reducing the number of the strand.

A system of forming the preshaped filler 24 and a system of deforming the preshaped filler 24 to the shaped filler 27 are sequentially explained with reference to FIG. 7 and FIG. 8, for cases where a fiber quantity of the filler member 20 is large and is small, that is, at respective positions of the side 50 that has a large width of the reinforcing fiber sheet and the side 51 that has a small width of the reinforcing fiber sheet.

Figure 7:
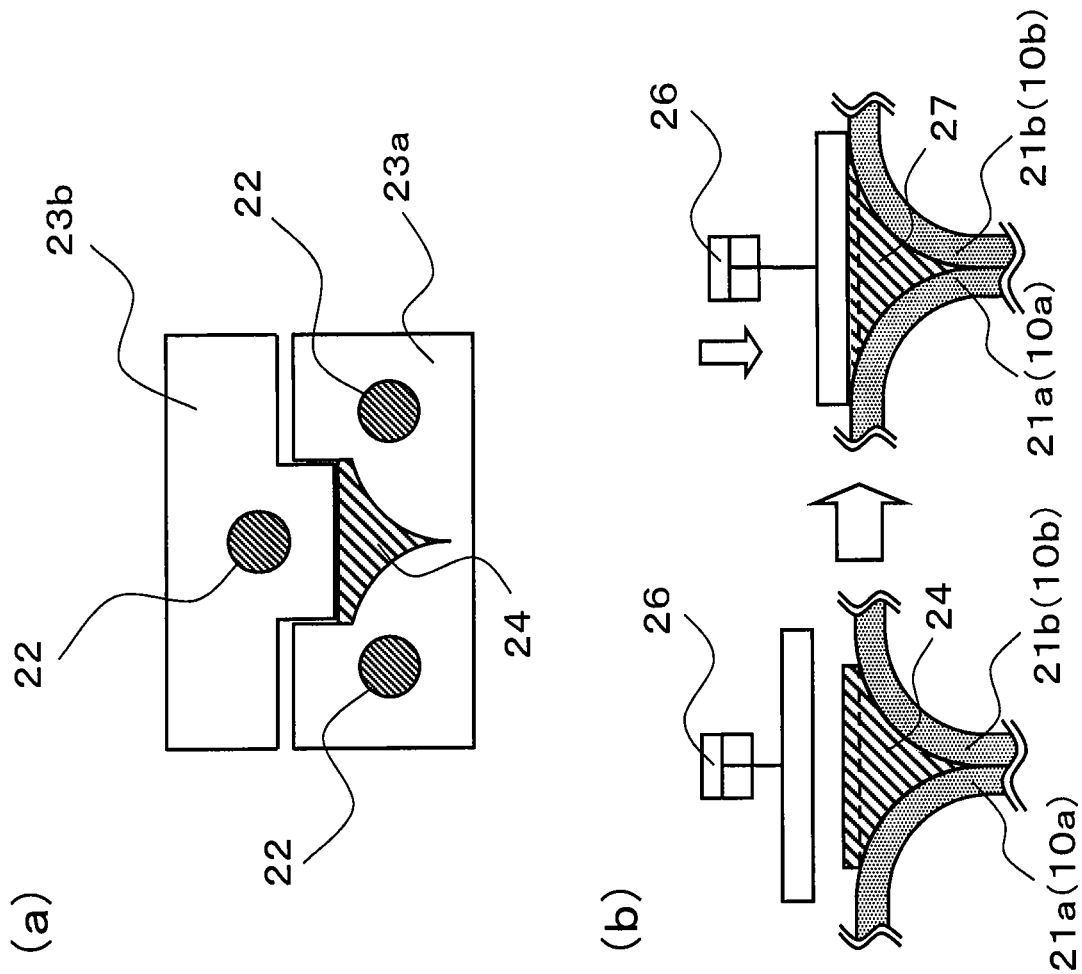
FIG. 7(a) is a schematic cross-sectional view showing a shape by a preshaping mold.
FIG. 7(b) is a schematic cross-sectional view showing a deformation principle to a shaped filler, when a filler member including a large quantity of fibers is used, respectively.

FIG. 7 are schematic cross-sectional views showing systems of forming the preshaped filler 24 from the filler member 20 having a large fiber quantity, and further deforming the preshaped filler 24 to the shaped filler 27.

As shown in FIG. 7(a), when a fiber quantity of the filler member 20 is large, the preshaping upper mold 23b is retracted upward from the preshaping lower mold 23a. The filler member 20 is heated and pressurized between the upper and lower preshaping molds, and is formed to the preshaped filler 24 having a straight line portion and a wedge portion. Subsequently, as shown in FIG. 7(b), the preshaped filler 24 is arranged in a gap, which is formed at the branching point of the reinforcing fiber base material at the assembly of the two L-shaped reinforcing fiber base materials 21a, 21b. Thereafter, the preshaped filler 24 is directly pressurized by the press machine 26 toward the gap formed at the branching point of the reinforcing fiber base materials. Accordingly, the fibers contained in the straight line portion (the portion corresponding to the straight line portion 30 of the preshaping lower mold 23a shown in FIG. 4) of the preshaped filler 24 are spread so as a curve line portion corresponding to a curvature of the bent portion of the L-shaped reinforcing fiber base materials 21a, 21b is provided.

Figure 8:
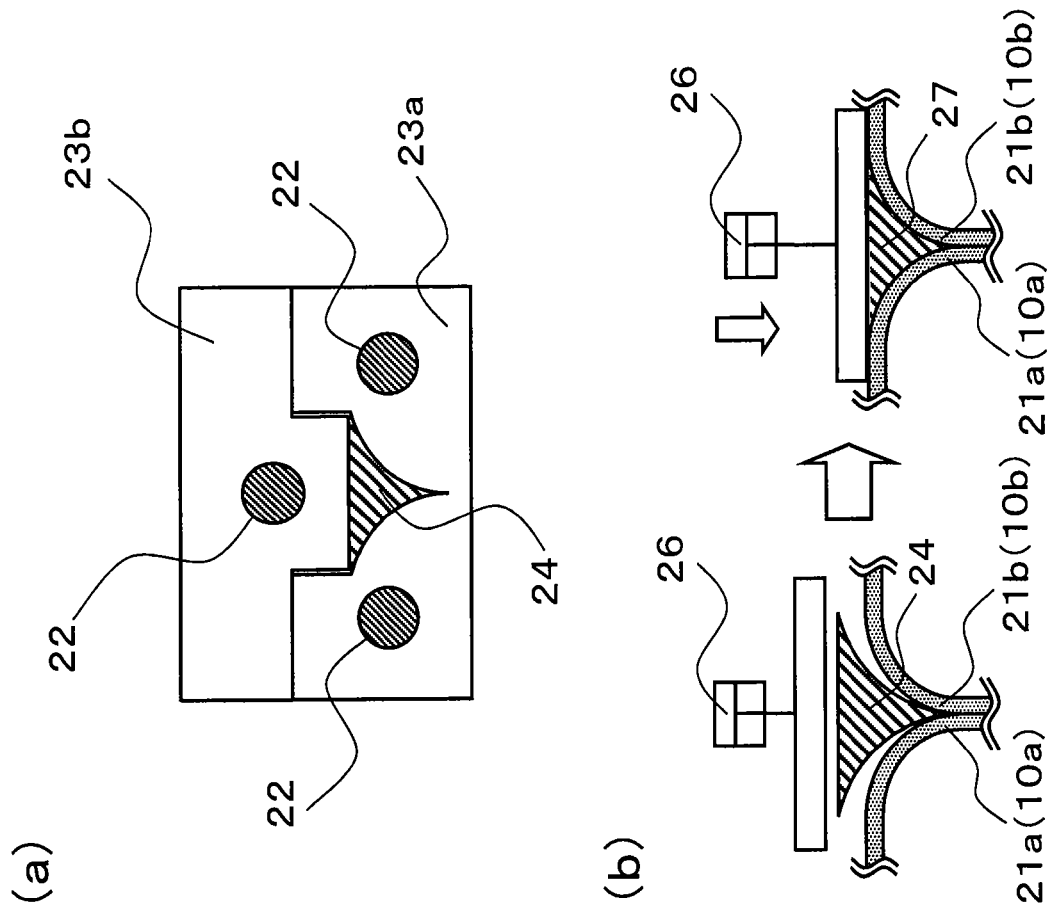
FIG. 8(a) is a schematic cross-sectional view showing a shape by a preshaping mold.
FIG. 8(b) is a schematic cross-sectional view showing a deformation principle to a shaped filler, when a filler member including a smallest quantity of fibers is used, respectively.

On the other hand, FIG. 8 are schematic cross-sectional views showing systems of forming the preshaped filler 24 from the filler member 20 having the smallest fiber quantity, and further deforming the preshaped filler 24 to the shaped filler 27.

As shown in FIG. 8(a), when a fiber quantity of the filler member 20 is the smallest, the filler member 20 is also formed into the preshaped filler 24 by being heated and pressurized between the upper and lower preshaping molds. However, because a fiber quantity of the filler member that is input to the preshaping mold is the smallest, a straight line portion is not formed in the preshaped filler 24. The preshaped filler 24 is thereafter arranged in a gap formed at the branching point of an assembly of the two L-shaped reinforcing fiber base materials 21a, 21b, as shown in FIG. 8(b).

The case where the fiber quantity of the filler member 20 is the smallest means a case where a curvature radius of a bent portion of the L-shaped reinforcing fiber base materials 21a, 21b corresponding to the shaped filler 27 is smaller than that in a case where a fiber quantity of the filler member 20 as shown in FIG. 7(b) is large (that is, a case where thicknesses of the L-shaped reinforcing fiber base materials 21a, 21b are large). On the other hand, the preshaped filler 24 obtained by the preshaping mold has a large curvature radius of the curve line portion that is formed along a shape of the concave portion of the preshaping lower mold 23a. Therefore, at a stage of arranging the preshaped filler 24 at the branching point of the L-shaped reinforcing fiber base materials 21a, 21b, only a tip of the wedge portion of the preshaped filler 24 is in a mode of being engaged, as shown in FIG. 8(b).

Thereafter, the shaped filler 27 is formed by deforming the preshaped filler 24 to follow the wedge shape of the gap, by the press machine 26.

Figure 9:
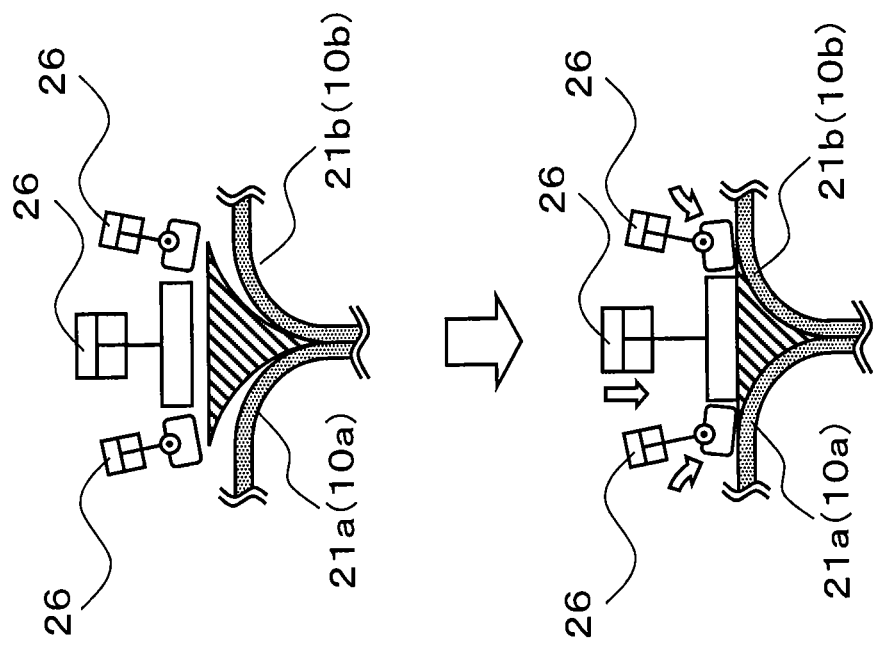
FIG. 9 is a schematic view showing an example of a preferable pressing method of a preshaped filler 24.

At the time of pressurizing the preshaped filler 24 by the press machine 26, preferably, the preshaped filler 24 is pressurized by a method indicated by FIG. 9, such that the preshaped filler 24 is deformed along the wedge shape of the gap. That is, preferably, the preshaped filler 24 is pressurized from outside to inside such that the preshaped filler 24 is deformed along the curve line of the wedge shape of the gap, on a cross-sectional surface orthogonal to a longitudinal direction of the preshaped filler 24. With this arrangement, a beam member in which the preshaped filler is filled deep into the gap with a proper density can be easily obtained.

A width of the press machine 26 preferably includes the branching point of the L-shaped reinforcing fiber base materials 21a, 21b and further includes a flat portion at both ends of the L-shaped reinforcing fiber base materials. Further, in the case of combining the flat-plate-shaped reinforcing fiber base material 10c after arranging the shaped filler 27 in the gap formed by the reinforcing fiber base materials having a bent portion as shown in FIG. 1, the flat-plate-shaped reinforcing fiber base material 10c is required to be superimposed to be in flat. Therefore, preferably, the press machine 26 has a sufficient width such that the shaped filler 27 can be pressed so as not to project upward exceeding the flat portion of the two L-shaped reinforcing fiber base materials 21a, 21b. Although air or oil is suitably used as a pressing mechanism of the press machine 26, the pressing mechanism is not limited to these. Preferably, a surface of the press machine 26 in contact with the preshaped filler 24 is heated to facilitate deformation of the preshaped filler 24.

In the embodiment explained above, although the curve line portion 31 of the preshaping lower mold has an arc shape corresponding to a curvature radius of a largest thickness (a largest number of stack layers) of the L-shaped reinforcing fiber base materials 21a, 21b, a shape of the curve line portion 31 is not limited to the arc shape. For example, the curve line portion 31 can have a straight line shape or a bent line shape as shown in FIGS. 10(a), (b), or can have a round tip of an arc shape portion that forms a wedge shape as shown in FIG. 10(c). However, from a viewpoint of filling the shaped filler deep inside the gap having a wedge shape formed at the branching point of the two L-shaped reinforcing fiber base materials 21a, 21b in a proper density without an unfilled portion, the curve line portion 31 has preferably a wedge shape having a sharp tip as shown in FIG. 4.

Further, the preshaping mold can have the following configuration.

FIG. 11(a) is a schematic cross-sectional view and FIG. 11(b) is a schematic perspective view, showing a preshaping mold according to another embodiment, respectively.

In FIG. 11(a), the preshaping lower mold 23a is divided into two of left and right sides. Each of the two preshaping lower molds 23a has combteeth which are parallel with a direction orthogonal to a mold length direction, and these combteeth are arranged in a mold length direction such that the combteeth of the left and right preshaping lower molds are engaged with each other. The two preshaping lower molds 23a also have a curve line portion 70 that forms a gap having a wedge by combining the two preshaping lower molds 23a. The curve line portion 70 is formed by an arc shape that matches a curvature radius of the bent portion at the branching point of the two L-shaped reinforcing fiber base materials 21a, 21b.

Further, a sliding mechanism 72 is provided between the preshaping lower molds 23a and the preshaping upper mold 23b such that positions of the preshaping lower molds 23a relative to the preshaping upper mold 23b in a horizontal direction can be changed. The preshaping lower molds 23a can be moved by pressurizing the preshaping lower molds 23a to an arrowhead direction in FIG. 11(a) by a pressing mechanism 71.

The preshaping lower molds 23a and the preshaping upper mold 23b are provided with one or plural hollow portions 22 in which a heater for heating the filler member 20 is passed through. The heater can be suitably selected in a similar manner to that of the preshaping mold described with reference to FIG. 4(b).

Figure 12:
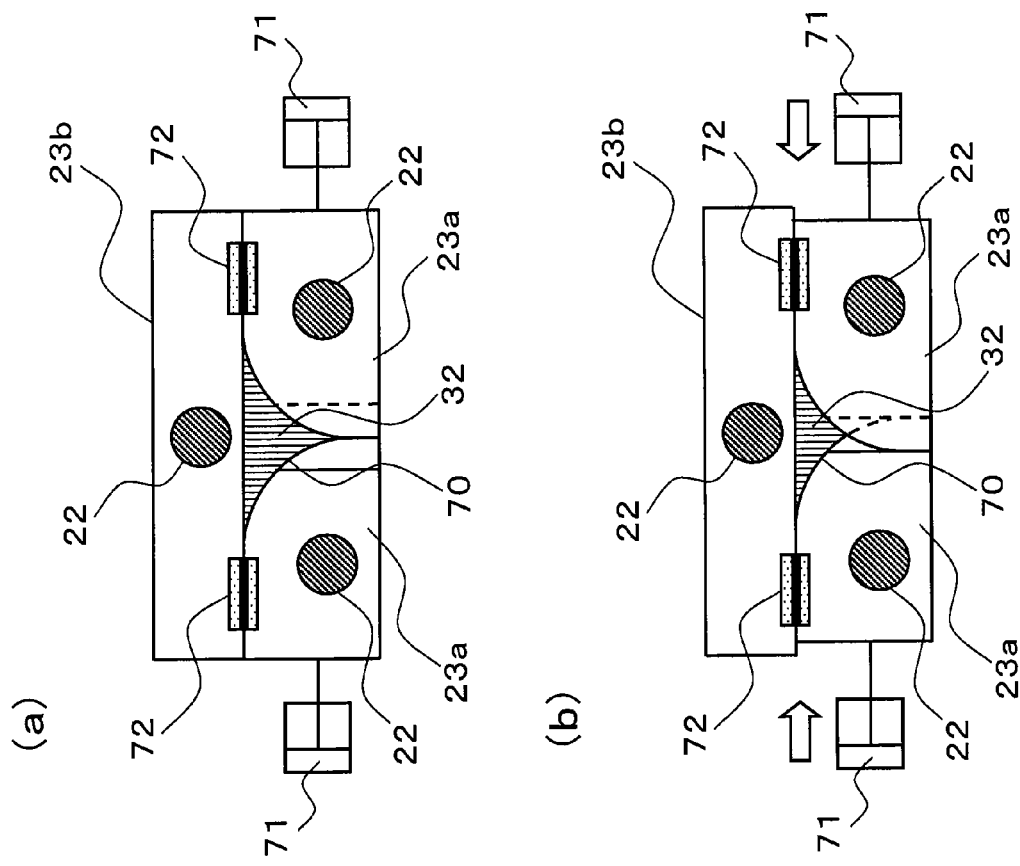
FIG. 12 is a schematic cross-sectional view showing an area change of a cross-sectional surface 32 of an area surrounded by a preshaping lower mold 23a and a preshaping upper mold 23b shown in FIGS. 11(a), (b).

A cross-sectional surface 32 of an area surrounded by the preshaping lower molds 23a and the preshaping upper mold 23b shown in FIG. 11 is explained below in further detail with reference to FIG. 12. FIGS. 12(a) and 12(b) are schematic cross-sectional views showing a change of a dimension of the cross-sectional surface 32 surrounded by the preshaping lower molds 23a and the preshaping upper mold 23b shown in FIG. 11.

In FIG. 12(a), a curvature radius of the curve line portion 70 of the preshaping lower molds 23a is matched with the curvature radius R+t at the hill side when the two L-shaped reinforcing fiber base materials 21a, 21b have a maximum thickness t, as described with reference to FIG. 5 in the above embodiment. The two left and right preshaping lower molds 23a can change their positions to where the combteeth are not engaged each other (FIG. 12(a)) and where the combteeth are engaged each other (FIG. 12(b)), by the sliding mechanism 72 provided between the preshaping lower molds 23a and the preshaping upper mold 23b. With this arrangement, a dimension of the area (the cross-sectional surface 32) surrounded by the preshaping lower molds 23a and the preshaping upper mold 23b can be changed, and a preshaped filler having a cross-sectional change can be formed.

Preferably, the combteeth of the preshaping lower molds 23a are fine and provided by a large number. With this arrangement, when the filler member 20 varying a quantity of fibers passes between the preshaping molds, it becomes difficult for the filler member to enter the concave portion. Further, because the filler member 20 can be more uniformly brought into contact with the preshaping lower molds 23a, uneven heating of the filler member can be prevented. It is preferable to increase a number of combteeth because there is a risk that a mold surface and the filler member 20 are not in contact with each other in the concave portion of engageable combteeth and that the filler member 20 is not heated. Preferably, a combteeth surface is made of a material having a mold release property such that the combteeth are not entangled with the filler member 20.

Regarding the move of the preshaping lower molds 23a in a horizontal direction, a servomotor can be used as the pressing mechanism 71, and an output of the servomotor can be suitably adjusted based on data input in advance corresponding to a change of a fiber quantity of the filler member 20. Further, the preshaping lower molds 23a can be arranged to be automatically accommodated at a proper position by reactive force of the filler member 20, by applying a constant pressure to the preshaping lower molds 23a using a spring, air, or hydraulic pressure. Needless to say, the mechanism is not limited to these arrangements.

Although not shown in the drawing, it is also preferable to provide combteeth on mutually opposing surfaces of the preshaping lower molds 23a and the preshaping upper mold 23b, as well as to configure at least one of the preshaping lower molds 23a and the preshaping upper mold 23b being able to be moved to a perpendicular direction. With this arrangement, a dimension of the cross-sectional area surrounded by the preshaping lower molds 23a and the preshaping upper mold 23b can be changed. The preshaping mold in this case can also employ an operation mechanism similar to that of a preshaping mold of which one of the upper and lower molds can move in a horizontal direction.

A method of folding a filler member to be carried to the preshaping mold is explained next.

Figure 13:
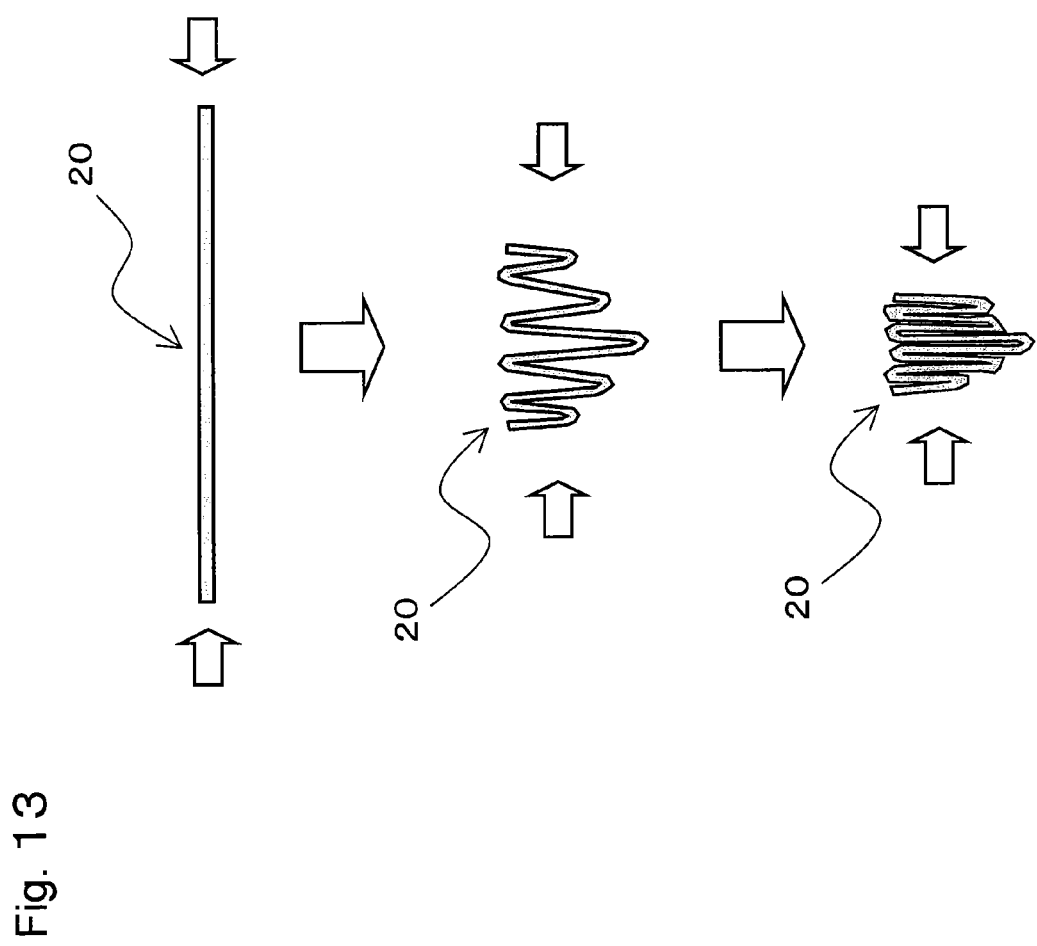
FIG. 13 is a schematic cross-sectional view showing an example of a method of folding a filler member used in the present invention.

FIG. 13 is a schematic cross-sectional view showing an example of a method of folding a reinforcing fiber sheet in the case of using the sheet for a filler member.

As showing in FIG. 13, preferably, the filler member 20 is folded in a wave shape at least three times to a width direction of a reinforcing fiber sheet such that an intermediate portion sandwiched between both ends of the filler member 20 becomes, in a longitudinal direction, approximately in parallel with a straight line portion of the preshaping mold (for example, the straight line portion 30 of the preshaping lower mold 23a shown in FIG. 4). With this arrangement, at the time of directly pressurizing the preshaped filler 24 by the press machine 26, fibers contained in the preshaped filler can be easily spread, and the preshaped filler 24 can be easily deformed to the shaped filler 27 that matches the shape of the gap. That is, as shown in FIG. 7(b), when a curvature radius at the branching point of the L-shaped reinforcing fiber base materials 21a, 21b is large, fibers at a folded portion corresponding to the straight line portion of the preshaped filler 24 (for example, a portion corresponding to the straight line portion 30 of the preshaping lower mold 23a shown in FIG. 4) is crashed by pressing or is turned to left and right, and the shaped filler 27 having a shape along the branching point is obtained. Further, as shown in FIG. 8(b), when a curvature radius of the branching point is small, the preshaped filler 24 is crashed by pressing to a downward arrowhead direction in FIG. 8(b), and the shaped filler 27 having a shape along the branching point is obtained.

Figure 14:
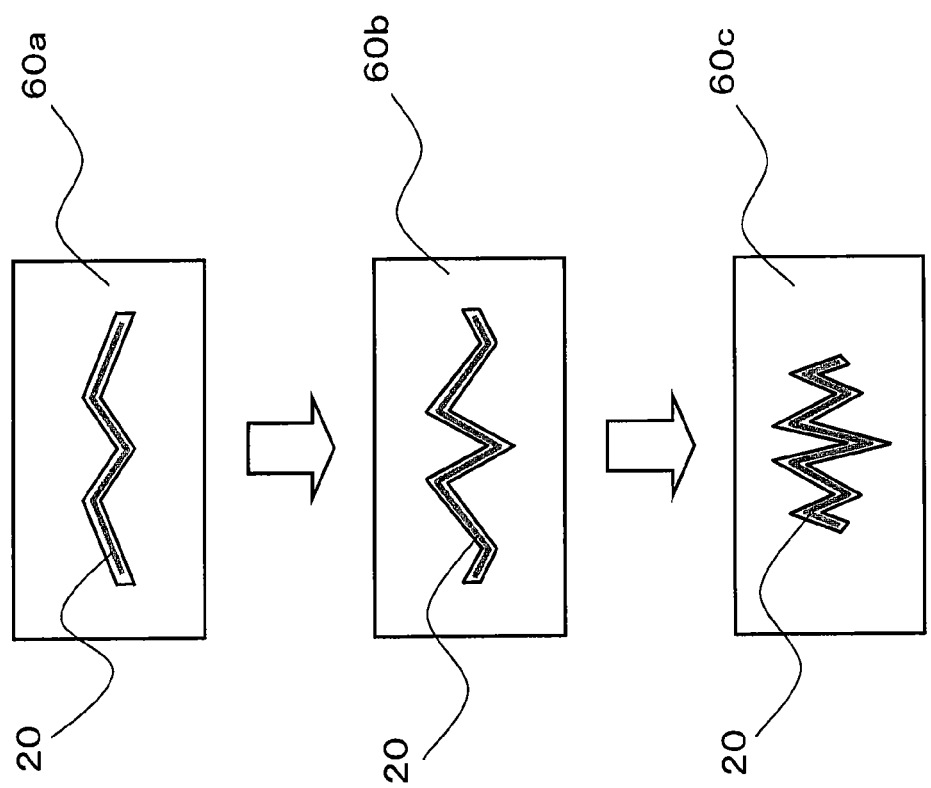
FIG. 14 is a schematic cross-sectional view showing a guide of a filler member used in the present invention.

As a method for securely folding the filler member 20, the filler member 20 can be gradually folded by passing the filler member 20 through folding guides 60a, 60b, 60c as shown in FIG. 14 in a longitudinal direction, where the guides are sequentially provided at upstream positions of the preshaping mold. Alternatively, the filler member 20 can be input to the filler preshaping mold, after preparing the filler member 20 that is folded in a wave shape in a longitudinal direction in advance.

As described above, the shaped filler 27 can be filled in a proper density in the beam member of which a cross-sectional shape changes in a longitudinal direction, by using the apparatus and the filler member 20 of which a fiber quantity is changed, that are shown in FIGS. 2 to 14.

The present invention can be, of course, applied to a case of producing a beam member having a constant cross-sectional shape in a longitudinal direction.

In the explanation of the above embodiment, a mode where a reinforcing fiber base material, in which an adhesive resin is arranged between layers of plural reinforcing fiber sheets, is used. Alternatively, a beam member can be also formed by using the above-described producing devices even when an adhesive resin is not provided between layers of plural reinforcing fiber sheets or when one reinforcing fiber sheet is used. For the reinforcing fiber base material, a reinforcing fiber sheet that is rounded in a rod shape or a cylindrical shape can be also applied. That is, by setting the reinforcing fiber sheet in a rod shape or a cylindrical shape having no end, and further by crashing the sheet by pressing in a flat-plate-shaped shape, for example, an object obtained as a result can be used for the reinforcing fiber base material as described above.

Further, a beam member obtained by the apparatus and the processes described above can be then formed as a reinforced fiber plastic mold article by injecting a matrix resin into the beam member (a preform), using an RTM method or a vacuum RTM method, when a dry reinforcing fiber base material or a reinforcing fiber sheet is used. When a dry base material is used as a reinforcing fiber base material and when a prepreg is used as a filler member, a reinforced fiber plastic mold article can be also obtained, by injecting a matrix resin into the reinforcing fiber base material using the RTM method or the vacuum RTM method. On the other hand, when a prepreg is used for a reinforcing fiber base material, a reinforced fiber plastic mold article can be obtained by pressurizing and/or heating to cure a beam member (a preform) by an autoclave (a pressure vessel).

Although a beam member having a T-shape cross-sectional surface is used to explain the above embodiment, a shape of a cross-sectional surface of the beam member in a longitudinal direction (a cross-sectional surface orthogonal to a longitudinal direction) can be a J shape, an I shape, or a + shape.

The present invention can be also applied to a production of a beam member using paper or a film, without limiting to a beam member using a reinforcing fiber base material, and an application range of the invention is not limited to these.

EXPLANATION OF REFERENCE NUMERALS 10a, 10b: L-shaped reinforcing fiber base material
10c: Flat-plate-shaped reinforcing fiber base material
11: Preform
12: Gap
20: Filler member
21a, 21b: Reinforcing fiber base material
22: Hollow portion
23a: Preshaping lower mold
23b: Preshaping upper mold
24: Preshaped filler
25: Mold
26: Press machine
27: Shaped filler
30: Straight line portion
31: Curve line portion
32: Cross-sectional surface of area surrounded by preshaping lower mold and preshaping upper mold
33: Guide shaft
40: Lateral width
50: Side of large width
51: Side of small width
60a, 60b, 60c: Folding guide
70: Curve line portion
71: Pressing mechanism
72: Sliding mechanism
80a, 80b: Material supplying apparatus
81: Pulling apparatus
82: Web portion forming apparatus
83: Flange portion forming apparatus
84: Filler forming apparatus
85: Integrating apparatus
86: Pulling mechanism
A: Cross-sectional area of gap portion when thickness is the smallest
B: Cross-sectional area surrounded when preshaping lower mold and preshaping upper mold are closest to each other.
R: Curvature radius of valley side of bent portion of reinforcing fiber base material
t: Thickness of L-shaped reinforcing fiber base material
Δt: Change of thickness of L-shaped reinforcing fiber base material

The invention claimed is:

1. A process for producing a beam member formed by a reinforcing fiber base material which has a web portion and at least a pair of flange portions extending to both sides via at least a branching point from the web portion, at a cross-sectional surface orthogonal to a longitudinal direction of the beam member, and by a shaped filler which fills a gap having a wedge shape formed at the branching point, and wherein a thickness of the reinforcing fiber base material changes in a longitudinal direction of the beam member and also a curvature radius of the reinforcing fiber base material at the branching point changes in the longitudinal direction of the beam member along a change of the thickness, and wherein the shaped filler is produced by at least the following production processes (A) to (C):

(A) a filler supply process for supplying a filler member configured by reinforcing fibers, wherein a reinforcing fiber sheet of which a quantity of reinforcing fibers changes in a longitudinal direction is supplied as the filler member;

(B) a preshaping process for providing a preshaped filler having at least a wedge projection portion, by pressurizing the filler member by a preshaping mold, wherein the preshaped filler of which a cross-sectional shape changes in a longitudinal direction is formed by using a preshaping mold made of at least two mutually opposing molds, and by changing a gap between the molds by changing a relative position between the molds in accordance with a passing of a filler member between the molds, and further, the reinforcing fiber base material and the preshaped filler are intermittently carried by synchronizing the both in a longitudinal direction, and the process (C) is performed immediately after the preshaped filler passes the preshaping mold; and (C) a filler deforming process for providing a shaped filler by deforming the preshaped filler, by filling the preshaped filler into the gap and by pressurizing the preshaped filler such that a tip of the wedge projection portion is directed to a tip of the gap having a wedge shape.

2. The process for producing a beam member according to claim (1), wherein, in the process (B), a filler member is preshaped by using a preshaping mold that has a mold (x) having a concave portion made of a straight line portion and a wedge portion, a mold (y) having a convex portion which can be engaged with the straight line portion of the mold (x), and a mechanism for changing a relative position of the mold (y) to the mold (x), and by passing the filler member through a gap between the mold (x) and the mold (y).

3. The process for producing a beam member according to claim (1), wherein, in the process (A), a reinforcing fiber sheet having a shape of which a width changes in a longitudinal direction is used as the filler member.

4. The process for producing a beam member according to claim (3), wherein, in the process (A), the reinforcing fiber sheet is folded in a wave shape at least three times to a width direction of the reinforcing fiber sheet.

5. The process for producing a beam member according to claim (3), wherein, a sheet comprising reinforcing fiber to which an adhesive resin in a particle shape, a fiber shape, or a sheet shape is partly added at least on one surface is used as the reinforcing fiber sheet.

6. The process for producing a beam member according to claim (3), wherein, a prepreg that is formed by impregnating a matrix resin in advance in reinforcing fibers which form a sheet is used as the reinforcing fiber sheet.

7. A process for producing a beam member formed by a reinforcing fiber base material which has a web portion and at least a pair of flange portions extending to both sides via at least a branching point from the web portion, at a cross-sectional surface orthogonal to a longitudinal direction of the beam member, and by a shaped filler which fills a gap having a wedge shape formed at the branching point, wherein the shaped filler is produced by at least the following production processes (A) to (C):

(A) a filler supply process for supplying a filler member configured by reinforcing fibers, wherein a reinforcing fiber sheet having a shape of which a width changes in a longitudinal direction is used as the filler member, and wherein a sheet comprising reinforcing fiber to which an adhesive resin in a particle shape, a fiber shape, or a sheet shape is partly added at least on one surface is used as the reinforcing fiber sheet;

(B) a preshaping process for providing a preshaped filler having at least a wedge projection portion, by pressurizing the filler member by a preshaping mold; and (C) a filler deforming process for providing a shaped filler by deforming the preshaped filler, by filling the preshaped filler into the gap and by pressurizing the preshaped filler such that a tip of the wedge projection portion is directed to a tip of the gap having a wedge shape.

8. A process for producing a beam member formed by a reinforcing fiber base material which has a web portion and at least a pair of flange portions extending to both sides via at least a branching point from the web portion, at a cross-sectional surface orthogonal to a longitudinal direction of the beam member, and by a shaped filler which fills a gap having a wedge shape formed at the branching point, wherein the shaped filler is produced by at least the following production processes (A) to (C):

(A) a filler supply process for supplying a filler member configured by reinforcing fibers, wherein the filler member is a reinforcing fiber sheet having a shape of which a width changes in a longitudinal direction, wherein the reinforcing fiber sheet is folded in a wave shape at least three times to a width direction of the reinforcing fiber sheet;

(B) a preshaping process for providing a preshaped filler having at least a wedge projection portion, by pressurizing the filler member by a preshaping mold; and (C) a filler deforming process for providing a shaped filler by deforming the preshaped filler, by filling the preshaped filler into the gap and by pressurizing the preshaped filler such that a tip of the wedge projection portion is directed to a tip of the gap having a wedge shape.

* * * * *